United States Patent
Lee et al.

(10) Patent No.: US 11,428,282 B2
(45) Date of Patent: Aug. 30, 2022

(54) PAD LINER FOR BRAKE APPARATUS

(71) Applicant: HYUNDAI MOBIS CO., LTD., Seoul (KR)

(72) Inventors: Kang Kuk Lee, Yongin-si (KR); Wan Kyu Lee, Yongin-si (KR); Jae Hwan Shim, Yongin-si (KR); Chang Seok Kim, Yongin-si (KR); Seong Hwan Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 75 days.

(21) Appl. No.: 16/817,321

(22) Filed: Mar. 12, 2020

(65) Prior Publication Data

US 2021/0062878 A1  Mar. 4, 2021

(30) Foreign Application Priority Data

Sep. 3, 2019  (KR) .................. 10-2019-0108681

(51) Int. Cl.
*F16D 65/097*  (2006.01)
*F16D 127/02*  (2012.01)

(52) U.S. Cl.
CPC ...... *F16D 65/0971* (2013.01); *F16D 2127/02* (2013.01)

(58) Field of Classification Search
CPC ............ F16D 65/0972; F16D 65/0977; F16D 65/0978; F16D 65/0979; F16D 2055/0041;

(Continued)

(56) References Cited

U.S. PATENT DOCUMENTS 7,219,773 B2 * 5/2007 Ono .................... F16D 65/0971
188/250 E
7,766,131 B2 * 8/2010 Hayashi ............. F16D 65/0972
188/73.37

(Continued)

FOREIGN PATENT DOCUMENTS

CN  106763341 A  5/2017
JP  08-261261 A  10/1996

(Continued)

OTHER PUBLICATIONS

English translation of JP 2015-148318 A (Year: 2015).*

(Continued)

*Primary Examiner* — Robert A. Siconolfi
*Assistant Examiner* — Mahbubur Rashid
(74) *Attorney, Agent, or Firm* — Morgan, Lewis & Bockius LLP (57) ABSTRACT

A pad liner for a brake apparatus may include: a body part brought into contact with a torque member; a pair of insertion parts connected to the body part such that a part of the torque member is inserted into the insertion parts; a pair of guide parts connected to the pair of insertion parts, respectively, and configured to guide a brake pad; a pair of support parts connected to the pair of guide parts, respectively, and configured to support the brake pad; and a pair of return parts connected to the pair of insertion parts, respectively, located on facing sides of the insertion parts, and configured to provide a return force to the same point of the brake pad when the brake pad is moved.

13 Claims, 10 Drawing Sheets

(58) Field of Classification Search
CPC .............. F16D 65/097; F16D 65/0971; F16D 65/0976; F16D 2125/582; F16D 65/52; F16D 65/54; F16D 2055/0029; F16D 2065/1396

See application file for complete search history.

(56) References Cited

U.S. PATENT DOCUMENTS

| | | | | |
|---|---|---|---|---|
| 8,776,959 | B2* | 7/2014 | Kaneko | F16D 65/0977 188/73.38 |
| 9,677,629 | B2* | 6/2017 | Boyle | F16D 55/225 |
| 9,777,783 | B2* | 10/2017 | Asahi | F16D 65/097 |
| 10,174,799 | B2* | 1/2019 | Toguri | F16D 65/097 |
| 10,400,838 | B2* | 9/2019 | Reynolds | F16D 65/0977 |
| 2010/0243385 | A1* | 9/2010 | Kaneko | F16D 65/0972 188/73.31 |
| 2011/0168503 | A1* | 7/2011 | Chelaidite | F16D 65/0972 188/73.31 |
| 2012/0205206 | A1* | 8/2012 | Chen | F16F 9/096 188/269 |
| 2013/0025981 | A1* | 1/2013 | Maehara | F16D 65/0978 188/72.3 |
| 2014/0131148 | A1* | 5/2014 | Plantan | F16D 65/097 188/73.38 |
| 2015/0211589 | A1 | 7/2015 | Mallmann | |
| 2016/0091038 | A1 | 3/2016 | Asahi et al. | |
| 2016/0195148 | A1* | 7/2016 | Shin | F16D 65/0972 188/73.38 |
| 2018/0038431 | A1* | 2/2018 | Gerber | F16D 55/2265 |
| 2018/0163800 | A1* | 6/2018 | Barbosa | F16D 55/2265 |
| 2019/0226539 | A1* | 7/2019 | Kim | F16D 65/0972 |

FOREIGN PATENT DOCUMENTS

| | | |
|---|---|---|
| JP | 2000-145841 A | 5/2000 |
| JP | 2010-060063 A | 3/2010 |
| JP | 2015-031325 A | 2/2015 |
| JP | 2015-048318 A | 3/2015 |
| JP | 2015-148318 A | 8/2015 |
| KR | 10-2009-0078675 A | 7/2009 |
| KR | 10-2018-0133140 A | 12/2018 |
| KR | 10-2019-0084430 A | 7/2019 |
| KR | 10-2019-0089668 A | 7/2019 |

OTHER PUBLICATIONS

Office Action of corresponding Korean Patent Application No. 10-2019-0108681—7 pages (dated Aug. 21, 2020).

Office Action of German Patent Application No. 10 2020 103 932.8—5 pages (dated Nov. 19, 2020).

Office Action issued in corresponding Chinese Patent Application No. 202010222327.9 dated Dec. 2, 2021.

* cited by examiner

PAD LINER FOR BRAKE APPARATUS

CROSS-REFERENCE TO RELATED APPLICATION

The present application claims priority under 35 U.S.C. § 119(a) to Korean Patent Application No. 10-2019-0108681 filed on Sep. 3, 2019 in the Korean Intellectual Property Office, which is incorporated herein by reference in its entirety.

BACKGROUND

1. Technical Field

Embodiments of the present disclosure relate to a pad liner for a brake apparatus, and more particularly, to a pad liner for a brake apparatus, which can generate a uniform return force when a brake pad is released.

2. Related Art

In general, a caliper of a brake apparatus refers to a part which is pressed against a brake disk and provides a braking force, when a pedal is stepped on. The caliper is constituted by a plurality of parts.

Among the parts of the brake caliper, a pad liner includes a return part for returning a brake pad to the original position using an elastic force. However, when the return part pressurizes the brake pad to the opposite side of the brake disk using an elastic restoring force, the pressurization position where the brake pad is pressurized may be changed. In this case, a uniform return force may not be generated.

The related art of the present disclosure is disclosed in Korean Patent Application Laid-Open No. 10-2009-0078675 published on Jul. 20, 2009 and entitled "Brake Device for Vehicle".

SUMMARY

Various embodiments are directed to a pad liner for a brake apparatus, which can generate a uniform return force when a brake pad is released.

In an embodiment, a pad liner for a brake apparatus may include: a body part brought into contact with a torque member; a pair of insertion parts connected to the body part such that a part of the torque member is inserted into the insertion parts; a pair of guide parts connected to the pair of insertion parts, respectively, and configured to guide a brake pad; a pair of support parts connected to the pair of guide parts, respectively, and configured to support the brake pad; and a pair of return parts connected to the pair of insertion parts, respectively, located on facing sides of the insertion parts, and configured to provide a return force to the same point of the brake pad when the brake pad is moved.

Each of the return parts may include: a first return part extended from each of facing sides of the insertion parts so as to be tilted toward the corresponding support part; a return connection part connected to the first return part; and a second return part connected to the return connection part, and extended in the opposite direction of the first return part. The clearance between the first and second return parts may increase as the location of the clearance is away from the return connection part.

When an external force is applied to the brake pad, the second return part may be elastically deformed while moved toward the first return part. When the external force is removed from the brake pad, the second return part may provide a return force to the brake pad while pressurizing the same point of the brake pad.

The first and second return parts may form a V-shape.

The second return part may be moved at the same height, when moved to the first return part and when moved away from the first return part.

The return part may further include a stiffness reinforcement part extended from the return connection part toward the second return part.

The return part may further include a contact protrusion formed on the second return part and brought into contact with the brake pad.

The body part may include: a body plate brought into contact with the torque member; and a pair of body extension parts extended from the body plate so as to be spaced part from each other, and connected to the insertion parts, respectively.

The body part may further include a contact part connected to the body plate between the pair of body extension parts, extended to the opposite side of the insertion part, and closely contacted with the torque member.

Each of the pair of insertion parts may include: a first insertion plate extended from an end of the body extension part so as to be bent to the one side; a second insertion plate extended from an end of the first insertion plate so as to be bent toward the guide part; and a third insertion plate extended from an end of the second insertion plate and bent in the opposite direction of the first insertion plate so as to face the first insertion plate, and connected to the guide part. The pair of return parts may be provided on facing sides of the pair of third insertion plates, respectively.

Each of the pair of insertion parts may further include a first insertion guide part connected to the third insertion plate on the opposite side of the return part, and extended from the third insertion plate so as to be tilted to the body part toward an end thereof.

Each of the pair of guide parts may include: a guide plate extended from the third insertion plate and connected to the support part; and a guide pressing part extended from one side of the guide plate to the opposite side of the first insertion plate, and closely contacted with the torque member.

Each of the pair of guide parts may further include a second insertion guide part extended from the opposite side of each of the facing sides of the guide plates so as to be tilted at a predetermined angle.

In the pad liner for a brake apparatus in accordance with the embodiment of the present disclosure, when an external force for the brake pad is removed through the V-shaped return part which is obliquely extended from each of the facing sides of the insertion parts to the guide part and bent toward the insertion part, the return part may pressurize the same position of the brake pad while restored to the original state by the elastic force, thereby generating a uniform return force in the brake pad.

Furthermore, since the stiffness of the return part is reinforced by the stiffness reinforcement part, the return part may be stably and elastically deformed or restored to the original state by the elastic force.

Furthermore, since the return part is brought into point contact with the brake pad through the contact protrusion, the return may easily pressurize the same point of the brake pad.

DETAILED DESCRIPTION

Hereinafter, a pad liner for a brake apparatus will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
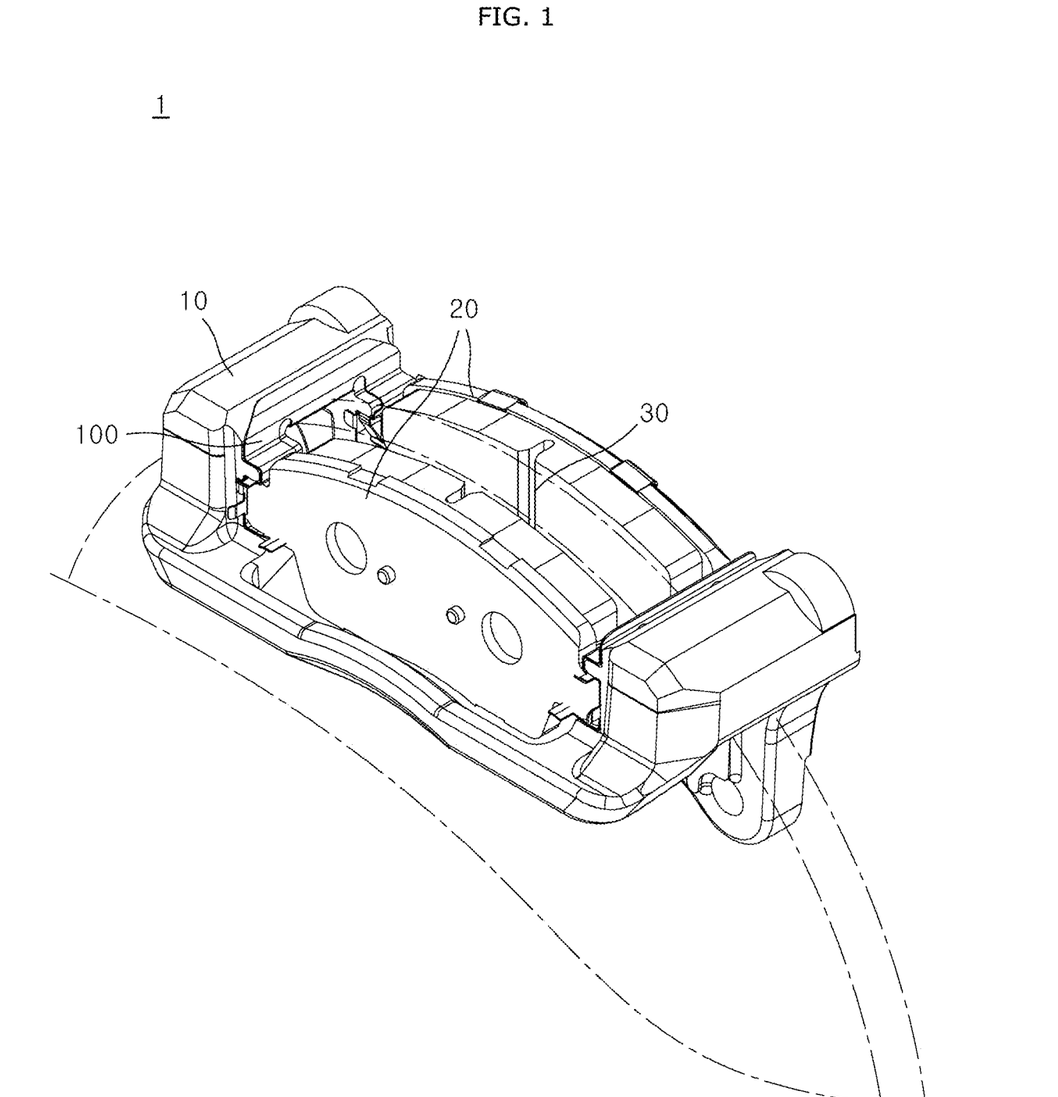
FIG. 1 is a perspective view schematically illustrating a brake apparatus in accordance with an embodiment of the present disclosure.
Figure 2:
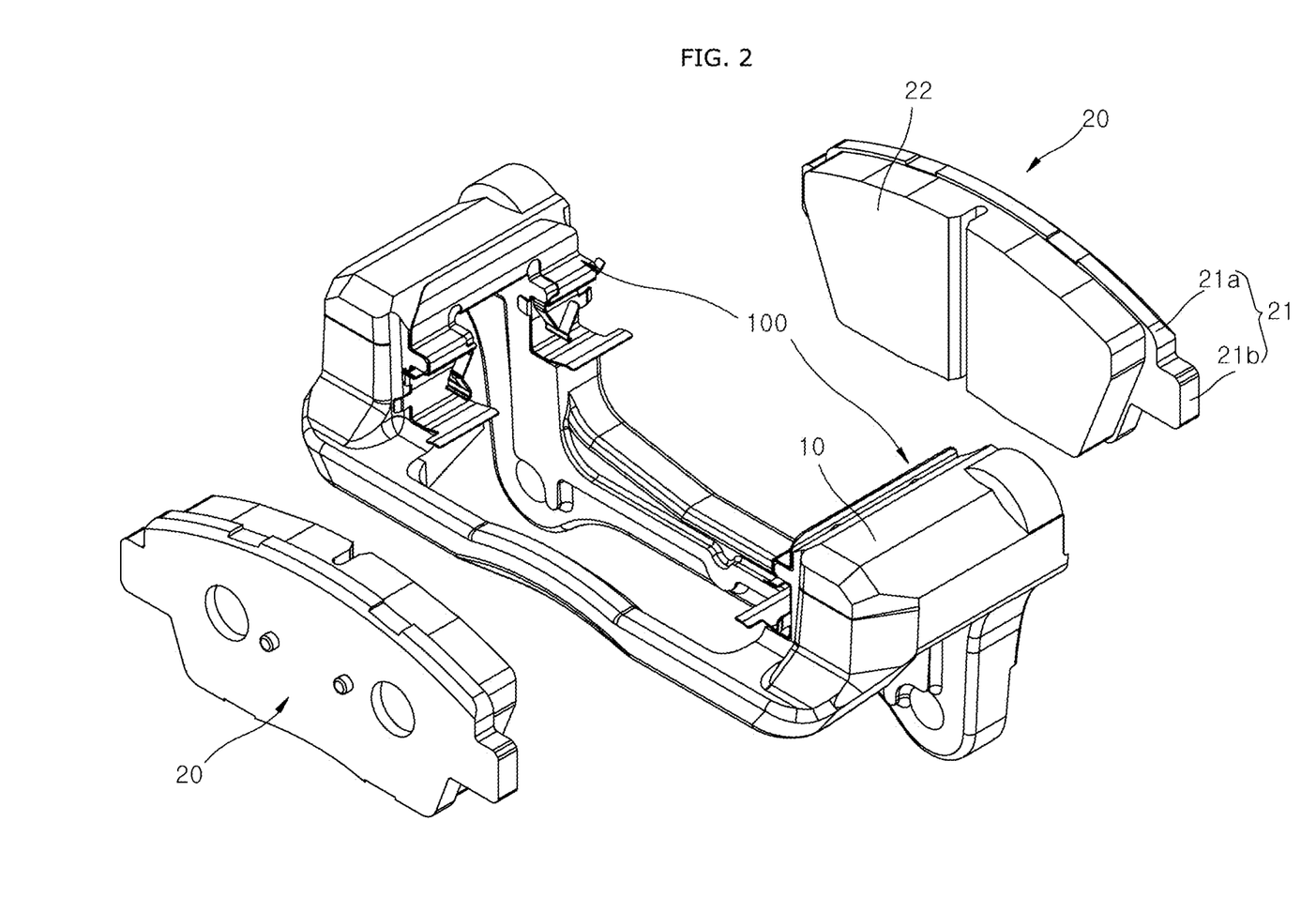
FIG. 2 is an exploded perspective view of the brake apparatus in accordance with the embodiment of the present disclosure.
Figure 3:
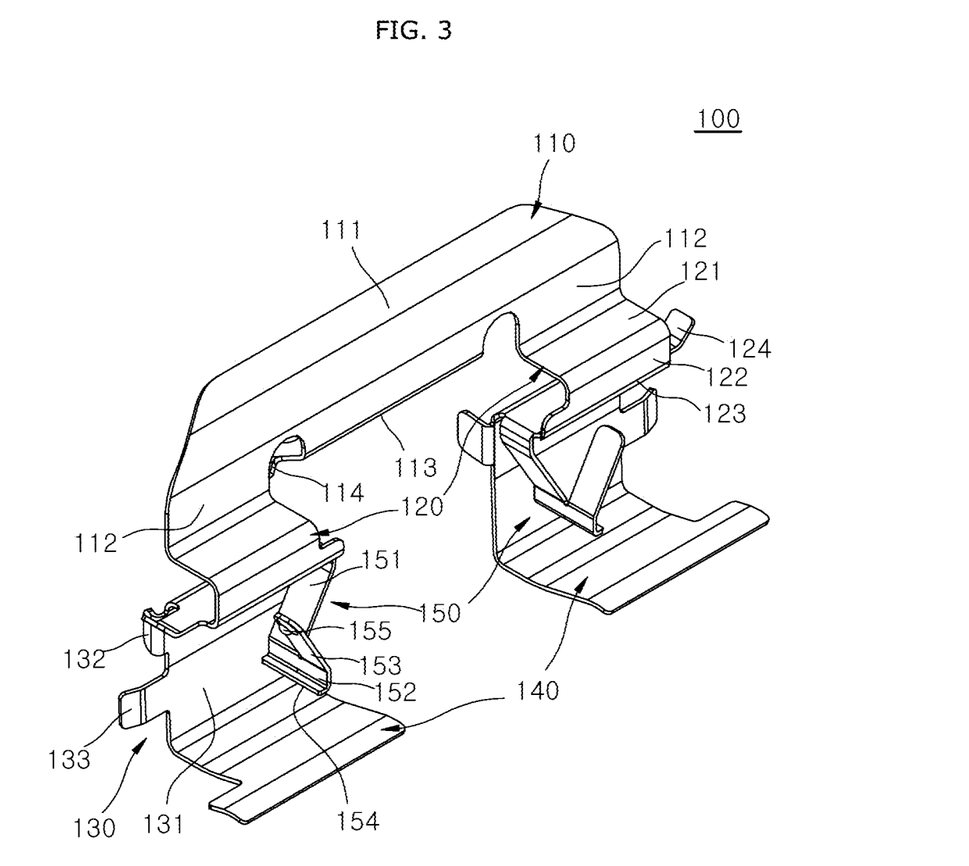
FIG. 3 is a perspective view illustrating a pad liner for the brake apparatus in accordance with the embodiment of the present disclosure.
Figure 4:
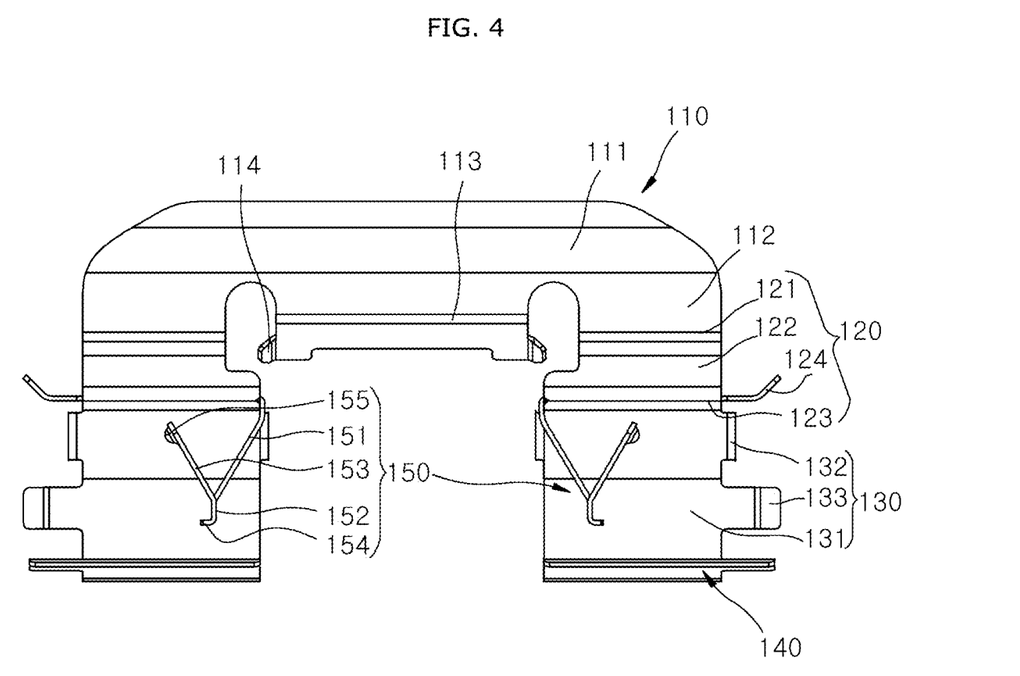
FIG. 4 is a front view of the pad liner for the brake apparatus in accordance with the embodiment of the present disclosure.
Figure 5:
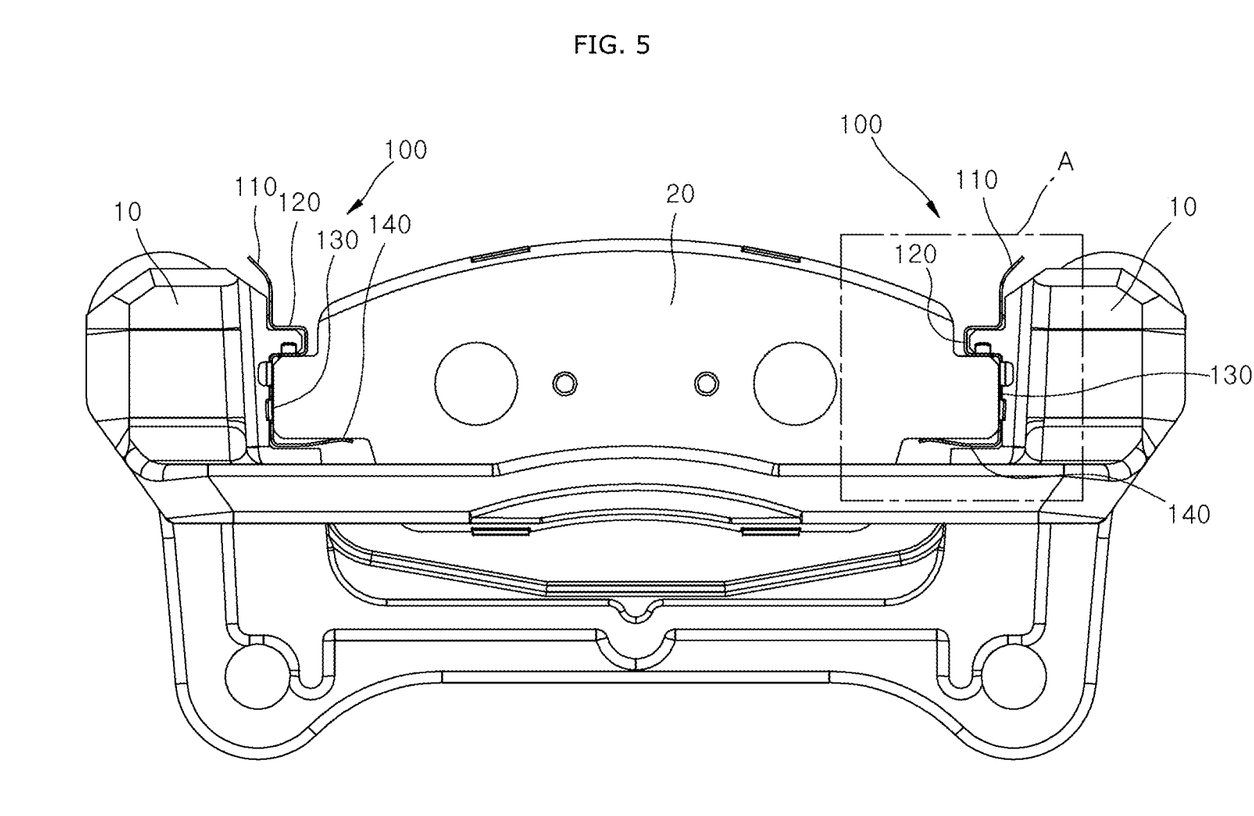
FIG. 5 is a side cross-sectional view of the brake apparatus in accordance with the embodiment of the present disclosure.
Figure 6:
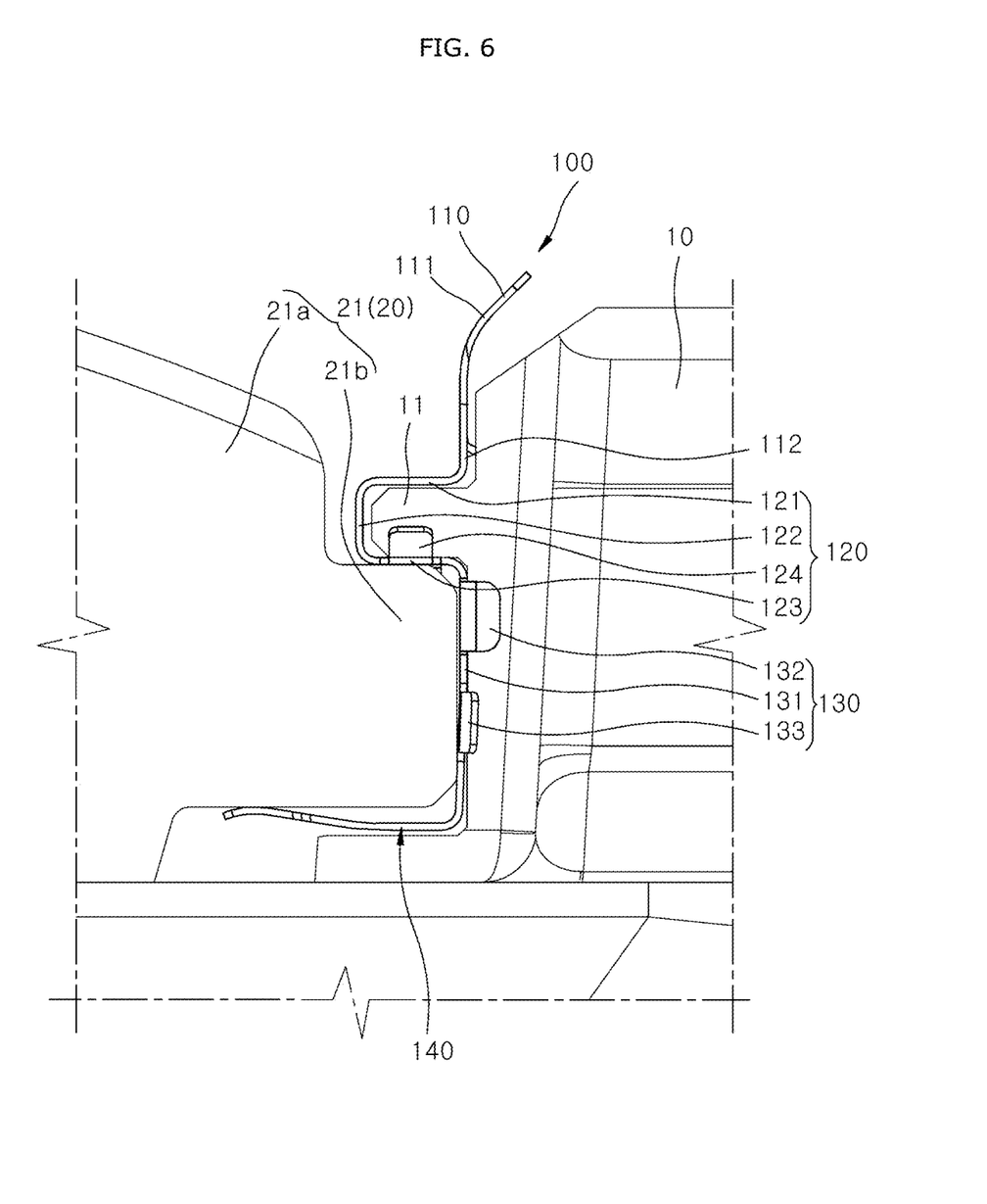
FIG. 6 is an expanded view of a portion A-A' in FIG. 5.
Figure 7:
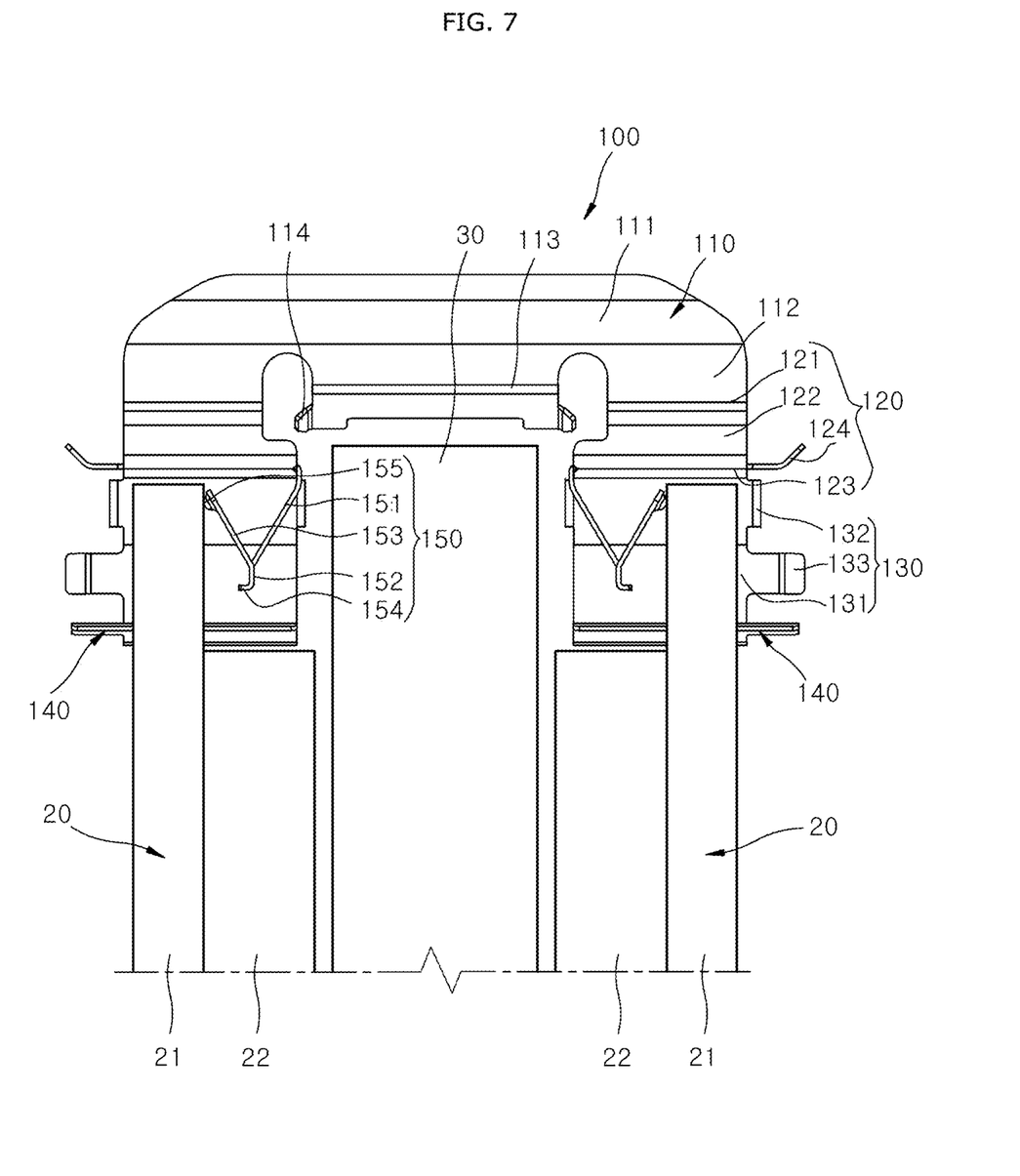
FIG. 7 is a view illustrating a state before a cylinder of the brake apparatus in accordance with the embodiment of the present disclosure is operated.
Figure 8:
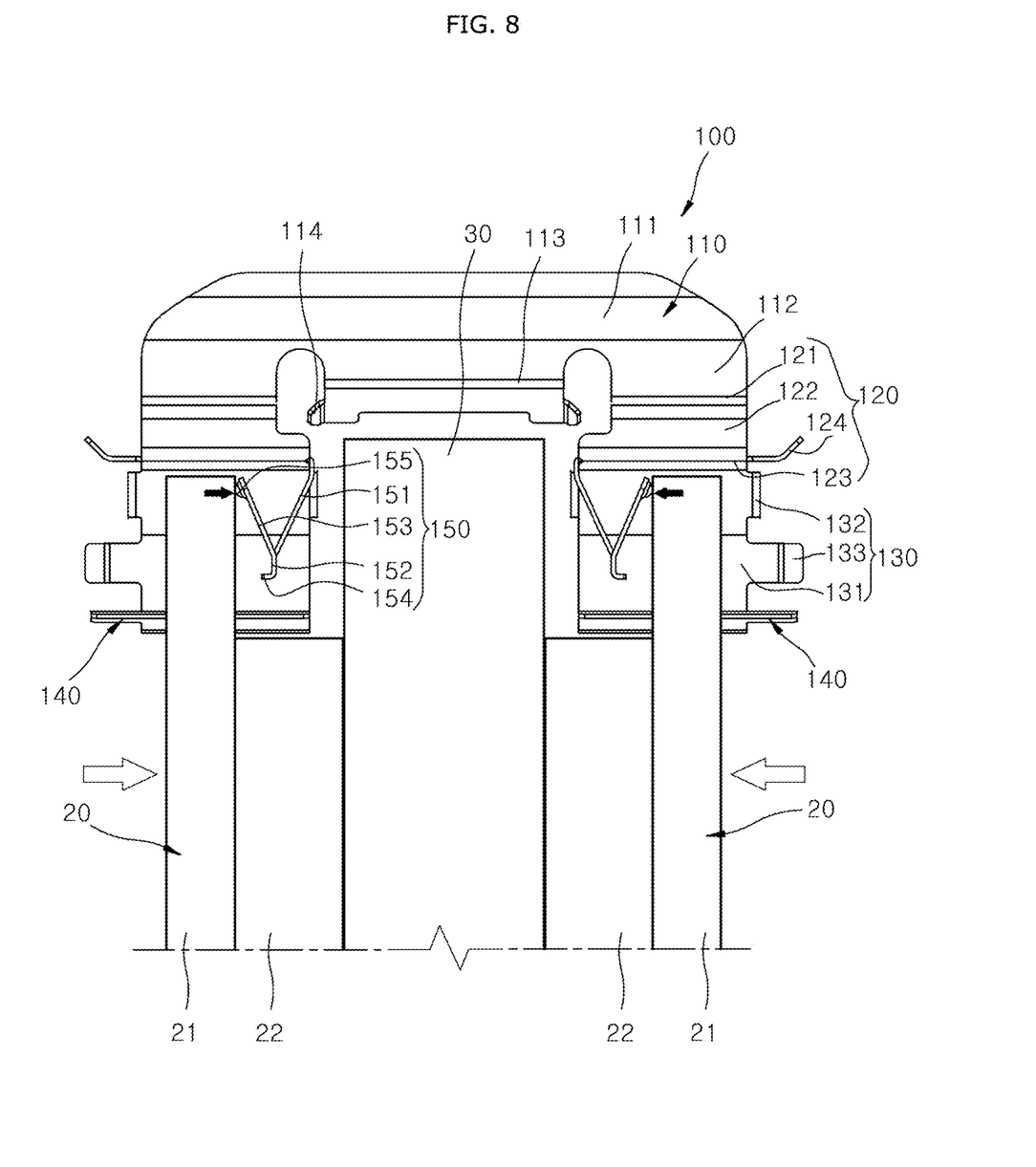
FIG. 8 is a view illustrating a brake pad which is moved by an operation of the brake apparatus in accordance with the embodiment of the present disclosure.
Figure 9:
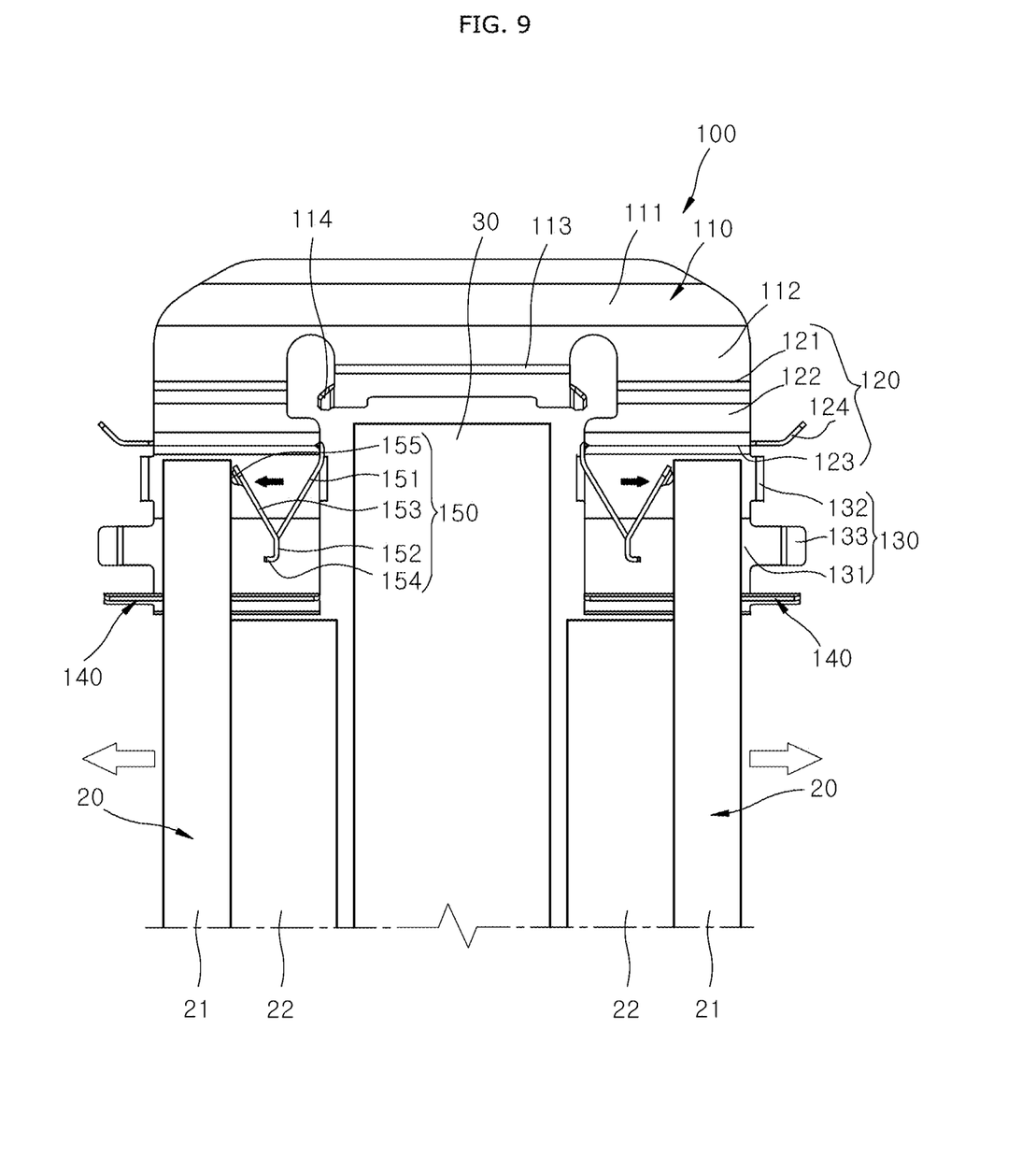
FIG. 9 is a view illustrating that the brake pad is returned to the original position when the operation of the cylinder of the brake apparatus in accordance with the embodiment of the present disclosure is released.
Figure 10:
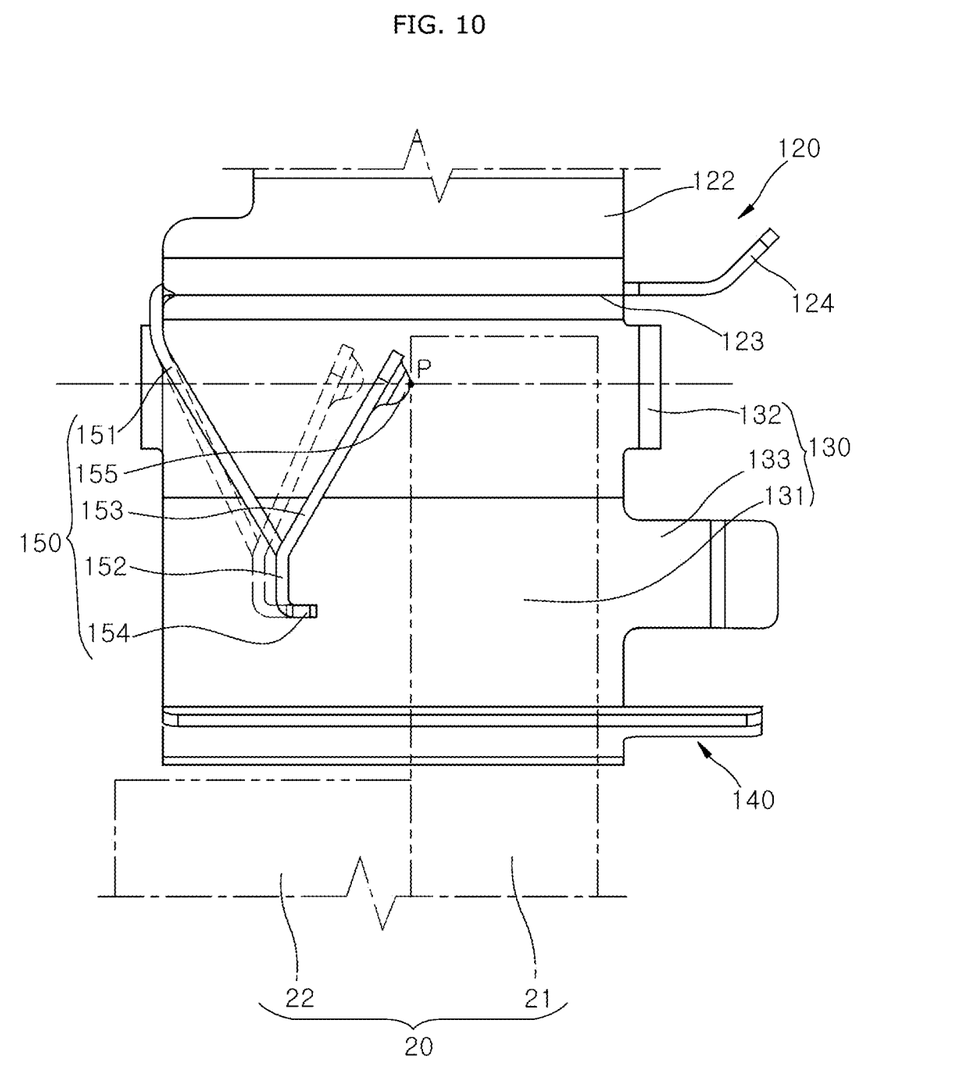
FIG. 10 is a view illustrating that a return part of the pad liner for the brake apparatus in accordance with the embodiment of the present disclosure pressurizes the same point of the brake pad while returned to the original position by an elastic force.

FIG. 1 is a perspective view schematically illustrating a brake apparatus in accordance with an embodiment of the present disclosure, FIG. 2 is an exploded perspective view of the brake apparatus in accordance with the embodiment of the present disclosure, FIG. 3 is a perspective view illustrating a pad liner for the brake apparatus in accordance with the embodiment of the present disclosure, FIG. 4 is a front view of the pad liner for the brake apparatus in accordance with the embodiment of the present disclosure, FIG. 5 is a side cross-sectional view of the brake apparatus in accordance with the embodiment of the present disclosure, FIG. 6 is an expanded view of a portion A-A' in FIG. 5, FIG. 7 is a view illustrating a state before a cylinder of the brake apparatus in accordance with the embodiment of the present disclosure is operated, FIG. 8 is a view illustrating a brake pad which is moved by an operation of the brake apparatus in accordance with the embodiment of the present disclosure, FIG. 9 is a view illustrating that the brake pad is returned to the original position when the operation of the cylinder of the brake apparatus in accordance with the embodiment of the present disclosure is released, and FIG. 10 is a view illustrating that a return part of the pad liner for the brake apparatus in accordance with the embodiment of the present disclosure pressurizes the same point of the brake pad while returned to the original position by an elastic force.

Referring to FIGS. 1 to 5, a pad liner 100 for the brake apparatus in accordance with the embodiment of the present disclosure includes a body part 110, a pair of insertion parts 120, a pair of guide parts 130, a pair of support parts 140 and a pair of return parts 150. The pad liner 100 for the brake apparatus may be made of a metallic material and formed as one body.

The body part 110 is brought into contact with a torque member 10. The body part 110 includes a body plate 111, a pair of body extension parts 112, a contact part 113 and a pressing part 114.

The body plate 111 is brought into contact with the torque member 10, and the pair of body extension parts 112 are extended from the body plate 111 so as to be spaced apart from each other, and connected to the respective insertion parts 120. The pair of body extension parts 112 are spaced apart from the body part 110, extended downward (based on FIGS. 2 and 3), and brought into contact with the torque member 10.

The contact part 113 is connected to the body plate 111 between the pair of body extension parts 112, and extended in the opposite direction of the insertion part 120. That is, the contact part 113 is extended to the rear side (based on FIG. 3) of the body part 110, and closely contacted with the torque member 10. The body part 110 may further include the pressing part 114. Thus, the body part 110 may be reliably coupled to the torque member 10.

The insertion part 120 is connected to the body part 110, and a torque member protrusion 11 of the torque member 10 is inserted into the insertion part 120. Specifically, the insertion part 120 is formed in a U-shape, and the torque member protrusion 11 is inserted into the insertion part 120 (see FIG. 3). In the present embodiment, the pair of insertion parts 120 are provided.

Since the torque member protrusion 11 is inserted and coupled to the insertion part 120, the body part 110 may be closely contacted with the torque member 10.

The guide part 130 is extended from the insertion part 120 to one side and brought into contact with the brake pad 20, and guides the movement of the brake pad 20. In the present embodiment, the pair of guide parts 130 are provided.

The brake pad 20 includes a pad support part 21 and a pad friction part 22.

The pad support part 21 includes a pad support part body 21a and a pad protrusion 21b. The pad support part body 21a may be coupled to a cylinder 40 and moved. The pad protrusion 21b is extended from either end of the pad support part body 21a, and inserted into the guide part 130. The pad friction part 22 is attached to the pad support part 21, and brought into contact with a brake disk 30 so as to provide friction.

The support part 140 is extended from the guide part 130 so as to be bent in the same direction as the insertion part 120, and supports the brake pad 20. The support part 140 is extended from the bottom (based on FIG. 5) of the guide part 130 so as to be bent toward the brake pad 20, and supports the brake pad 20 when the brake pad 20 is moved (see FIG. 5).

The pair of return parts 150 are connected to the pair of insertion parts 120, respectively, positioned on facing sides of the insertion parts 120, and provide a return force to the same point of the brake pad 20 when the brake pad 20 is moved. Specifically, a second return part 153 is moved at the same height, when moved toward a first return part 151 and when moved away from the first return part 151.

The return parts 150 are extended obliquely toward the guide parts 130 from the facing sides of the insertion parts 120 and bent toward the insertion parts 120, and return the brake pad 20 to the original position using an elastic force. In the present embodiment, the pair of return parts 150 are provided.

Specifically, the pair of return parts 150 are extended downward from the sides of the insertion parts 120 (based on FIGS. 3 and 4), and formed in a V-shape.

Since the return part 150 has a bending shape such as the V-shape, the return part 150 can be mounted even in a narrow space. Since two parts of the return part 150, i.e. first and second return parts 151 and 153, provide an elastic restoring force, the return part 150 can provide a larger return force than the return part 150 having the same size.

The return part 150 is made of an elastic material and disposed between the brake pads 20, and induces the brake pad 20 to be separated from the brake disk 30, using an elastic force, when an external force provided to the brake pad 20 by the cylinder 40 is removed.

At this time, while the return part 150 is returned to the original state through the elastic force, the return part 150 may pressurize the brake pad 20 such that the brake pad 20 can be separated from the brake disk 30.

As described above, the return part 150 is extended in a V-shape from the insertion part 120. Thus, when the external force for the brake pad 20 is removed, the return part 150 pressurizes the same point of the brake pad 20 while returned to the original state by the elastic force (see FIGS. 9 and 10). Therefore, a uniform restoring force may be generated for the brake pad 20.

The return part 150 includes the first return part 151, a return connection part 152, the second return part 153 and a stiffness reinforcement part 154. The first return part 151 is extended obliquely toward the corresponding guide part 130 from each of the facing sides of the insertion parts 120. Specifically, the first return part 151 is extended from each of facing sides of third insertion plates 123 of the insertion parts 120 so as to be bent toward the rear side of the corresponding third insertion plate 123.

The return connection part 152 is formed in a plate shape and connected to the first return part 151. The return connection part 152 has one side connected to the first return part 151 and the other side connected to the second return part 153. The first and second return parts 151 and 153 are connected in the front-to-rear direction of the return connection part 152 (based on FIG. 3).

The second return part 153 is connected to the return connection part 152, and extended obliquely toward the insertion part 120 so as to deviate from the first return part 151. The second return part 153 is extended obliquely toward the third insertion plate 123 from the return connection part 152.

That is, the first return part 151 is extended obliquely toward the corresponding support part 140 from each of the facing sides of the insertion parts 120, the return connection part 152 connects the first and second return parts 151 and 153, and the second return part 153 is connected to the return connection part 152 and extended in the opposite direction of the first return part 151.

The clearance between the first and second return parts 151 and 153 increases as the location of the clearance is away from the return connection part 152.

The return part 150 further includes the stiffness reinforcement part 154 and a contact protrusion 155. The stiffness reinforcement part 154 is extended from the return connection part 152 so as to be bent toward the second return part 153. Thus, the stiffness of the return part 150 may be reinforced so that the return part 150 is stably and elastically deformed or restored to the original state by the elastic force.

The contact protrusion 155 is formed on the second return part 153 and brought into contact with the brake pad 20. Since the return part 150 is brought in point contact with the brake pad 20 through the contact protrusion 155, the return part 150 may easily pressurize the same point of the brake pad 20.

The insertion part 120 includes a first insertion plate 121, a second insertion plate 122 and a third insertion plate 123. In the present embodiment, the pair of insertion parts 120 are provided.

The first insertion plate 121 is extended from an end of the body extension part 112 so as to be bent toward one side, i.e. the front side of the body extension part 112.

The second insertion plate 122 is extended from the first insertion plate 121 so as to be bent toward the guide part 130.

The third insertion plate 123 is extended from an end of the second insertion plate 122 toward the opposite side of the first insertion plate 121, i.e. the rear side of the second insertion plate 122 so as to face the first insertion plate 121. The return part 150 is extended from the third insertion plate 123, and the third insertion plate 123 is connected to the guide part 130. The torque member protrusion 11 protruding from the torque member 10 is inserted into a space formed by the first insertion plate 121, the second insertion plate 122 and the third insertion plate 123.

The insertion part 120 further includes a first insertion guide part 124. The first insertion guide part 124 is extended from the opposite side of each of the facing sides of the third insertion plates 123 so as to be tilted at a predetermined angle to the first insertion plate 121.

That is, the first insertion guide part 124 is connected to the third insertion plate 123 on the opposite side of the return part 150, and extended from the third insertion plate 123 so as to be tilted to the body part 110 toward the end thereof.

Therefore, when the brake pad 20 is assembled to the guide part 130, the brake pad 20 may be easily guided toward the guide part 130 and assembled to the guide part 130. Furthermore, when the torque member protrusion 11 is inserted into the insertion part 120, the torque member protrusion 11 may be restricted from moving in a horizontal direction.

The guide part 130 includes a guide plate 131, a guide pressing part 132 and a second insertion guide part 133. The guide plate 131 is extended from the third insertion plate 123 to one side, and connected to the support part 140. The guide plate 131 is extended from an end of the third insertion plate 123 to the bottom side (based on FIG. 3), and brought into contact with the torque member 10.

The guide pressing part 132 is extended from one side or both sides of the guide plate 131 to the opposite side of the first insertion plate 121, i.e. the rear side of the guide plate 131, and closely contacted with the torque member 10. The guide pressing part 132 may press the torque member protrusion 11 inserted into the insertion part 120 using an elastic force. Specifically, the guide pressing part 132 is elastically deformed while the torque member protrusion 11 is inserted into the insertion part 120. However, once the torque member protrusion 11 is inserted into the insertion part 120, the guide pressing part 132 is restored to the original state by the elastic force and closely contacted with the torque member protrusion 11 while pressing the torque member protrusion 11. Thus, a coupling force between the insertion part 120 and the torque member protrusion 11 is increased.

The second insertion guide part 133 is extended from the opposite side of each of the facing sides of the guide plates 131 so as to be tilted at a predetermined angle to the front side of the corresponding guide plate 131. Therefore, when the brake pad 20 is assembled to the guide part 130, the brake pad 20 may be easily guided toward the guide part 130 and assembled to the guide part 130.

Hereafter, the operation and effect of the brake apparatus in accordance with the embodiment of the present disclosure will be described with reference to FIGS. 7 to 10.

When the pad liner 100 for the brake apparatus is coupled to the torque member 10, the brake pad 20 is mounted. At this time, the return part 150 is brought into contact with the pad protrusion 21b of the brake pad 20. The pad protrusion 21b of the pad support part 21 is moved along the guide part 130 by an operation of a piston 40.

When a driver steps on a brake pedal (not illustrated), hydraulic pressure is transferred to the torque member 10. The hydraulic pressure causes the piston 40 to pressurize the brake pad 20 against the brake disk 30 (see FIG. 8). As the brake pad 20 is brought in frictional contact with the brake disk 30, a braking force is generated. At this time, the return part 150 is elastically deformed by the pressurization of the brake pad 20. Specifically, the return part 150 is elastically deformed by the pressurization of the brake pad 20, such the distance between the first and second return parts 151 and 153 based on the return connection part 152 is reduced.

Then, when a driver doest not step on the brake pedal during a braking release operation, no hydraulic pressure is transferred to the piston 40, and the elastic force of the return part 150 restores the brake pad 20 such that the brake pad 20 is sufficiently spaced apart from the brake disk 30. The return part 150 pressurizes the brake pad 20 to the opposite side of the brake disk 30, and spaces the brake pad 20 apart from the brake disk 30 to the left/right side (based on FIG. 9) of the brake disk 30. Specifically, while the return part 150 is restored to the original state by the elastic forces of the first and second return parts 151 and 153, the distance between the first and second return parts 151 and 153 increases. At this time, the second return part 153 pressurizes the same point of the brake pad 20.

In the pad liner 100 for the brake apparatus in accordance with the embodiment of the present disclosure, the return part 150 is formed in a V-shape. Thus, when the brake pedal is released, the return part 150 may pressurize the same point of the brake pad 20 while restored to the original state by the elastic force, such that a uniform return force can be generated for the brake pad 20. Therefore, uniform friction between the brake pad 20 and the brake disk 30 can be achieved.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pad liner for a brake apparatus, comprising:
a body part brought into contact with a torque member;
a pair of insertion parts connected to the body part such that a part of the torque member is inserted into the insertion parts;
a pair of guide parts connected to the pair of insertion parts, respectively, and configured to guide a brake pad;
a pair of support parts connected to the pair of guide parts, respectively, and configured to support the brake pad; and
a pair of return parts connected to the pair of insertion parts, respectively, extending from facing sides of the insertion parts, and configured to provide a return force to a same point of the brake pad when the brake pad is moved.

2. The pad liner of claim 1, wherein each of the return parts comprises:
a first return part extended from each of facing sides of the insertion parts so as to be tilted toward the corresponding support part;
a return connection part connected to the first return part; and
a second return part connected to the return connection part, and extended in the opposite direction of the first return part,
wherein a clearance between the first and second return parts increases as a location of the clearance is away from the return connection part.

3. The pad liner of claim 2, wherein when an external force is applied to the brake pad, the second return part is elastically deformed while moved toward the first return part,
wherein when the external force is removed from the brake pad, the second return part provides a return force to the brake pad while pressurizing a same point of the brake pad.

4. The pad liner of claim 3, wherein the first and second return parts form a V-shape.

5. The pad liner of claim 4, wherein the second return part is moved at a same height, when moved to the first return part and when moved away from the first return part.

6. The pad liner of claim 2, wherein the return part further comprises a stiffness reinforcement part extended from the return connection part toward the second return part.

7. The pad liner of claim 2, wherein the return part further comprises a contact protrusion formed on the second return part and brought into contact with the brake pad.

8. The pad liner of claim 1, wherein the body part comprises:
a body plate brought into contact with the torque member; and
a pair of body extension parts extended from the body plate so as to be spaced part from each other, and connected to the insertion parts, respectively.

9. The pad liner of claim 8, wherein the body part further comprises a contact part connected to the body plate between the pair of body extension parts, extended to an opposite side of the insertion part, and closely contacted with the torque member.

10. The pad liner of claim 8, wherein each of the pair of insertion parts comprises:
a first insertion plate extended from an end of the body extension part so as to be bent to one side;
a second insertion plate extended from an end of the first insertion plate so as to be bent toward the guide part; and
a third insertion plate extended from an end of the second insertion plate and bent in the opposite direction of the first insertion plate so as to face the first insertion plate, and connected to the guide part,
wherein the pair of return parts are provided on facing sides of the pair of third insertion plates, respectively.

11. The pad liner of claim 10, wherein each of the pair of insertion parts further comprises a first insertion guide part connected to the third insertion plate on the opposite side of the return part, and extended from the third insertion plate so as to be tilted to the body part toward the body plate thereof.

12. The pad liner of claim 10, wherein each of the pair of guide parts comprises:
    a guide plate extended from the third insertion plate and connected to the support part; and
    a guide pressing part extended from one side of the guide plate to the opposite side of the first insertion plate, and closely contacted with the torque member.

13. The pad liner of claim 12, wherein each of the pair of guide parts further comprises a second insertion guide part extended from the opposite side of each of the facing sides of the guide plates so as to be tilted at a predetermined angle.

\* \* \* \* \*